UNITED STATES PATENT OFFICE.

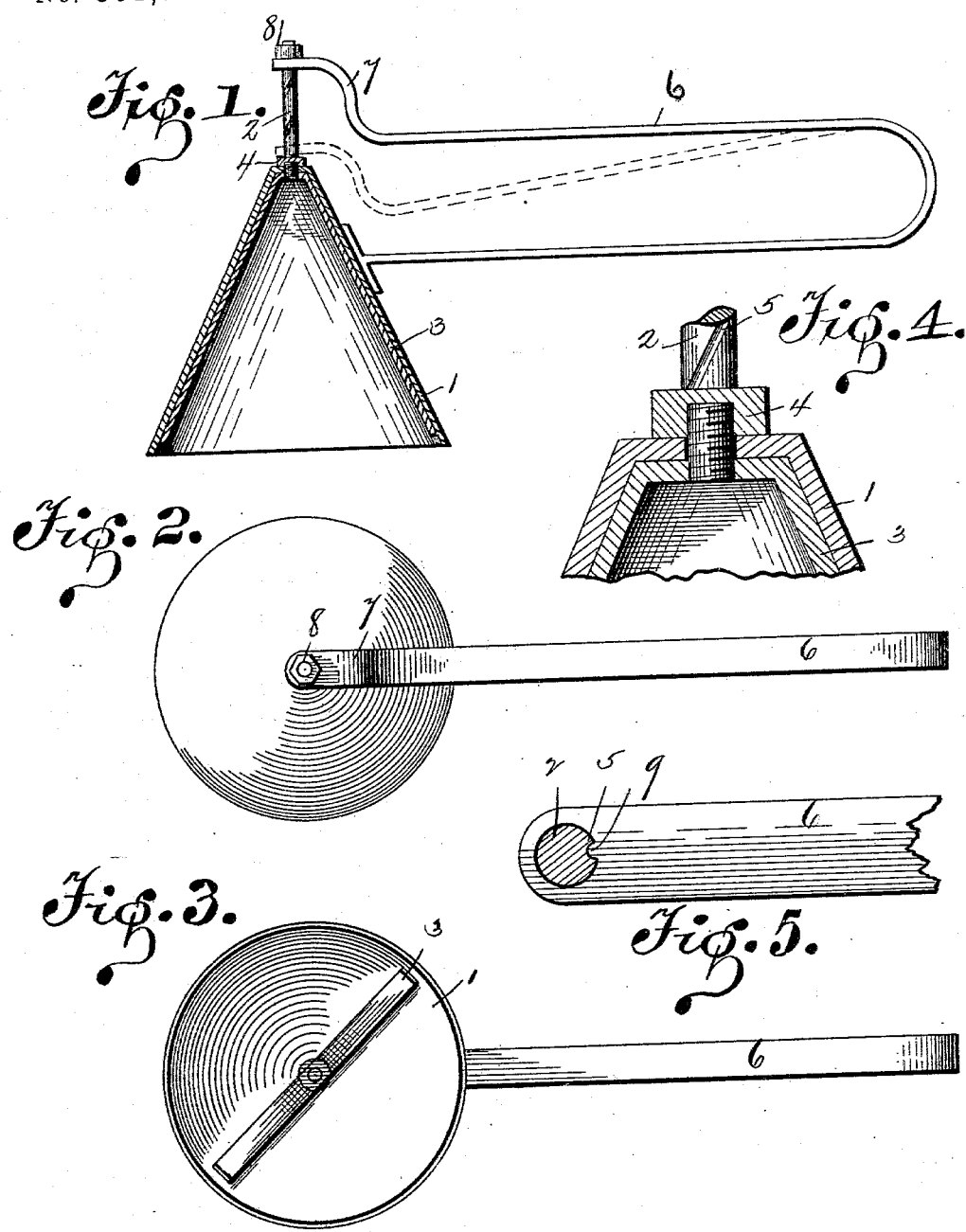
(No Model.)
A. L. RIGGS.
ICE CREAM MOLD.
No. 561,727.  Patented June 9, 1896.
Witnesses:
A. R. Appleman
Bert Riggs
Inventor:
Alfred L. Riggs.
By Henry C. Evert Atty.

ALFRED L. RIGGS, OF KNOXVILLE, PENNSYLVANIA.

ICE-CREAM MOLD.

SPECIFICATION forming part of Letters Patent No. 561,727, dated June 9, 1896.

Application filed March 7, 1896. Serial No. 582,256. (No model.)

*To all whom it may concern:*

Be it known that I, ALFRED L. RIGGS, a citizen of the United States of America, residing at Knoxville Borough, in the county of Allegheny and State of Pennsylvania, have invented certain new and useful Improvements in Ice-Cream Molds, of which the following is a specification, reference being had therein to the accompanying drawings.

This invention relates to certain new and useful improvements in ice-cream molds, and has for its object the provision of new and novel means whereby it will require but one hand to dip the cream from the freezer or other receptacle containing the same and remove from the mold or shaper, while in the ordinary construction both hands are required, one to hold the mold or dipper and the other to turn the cutters employed for removing the cream from the sides of the mold.

The invention has for its further object the combination of a mold of the above-referred-to class that will be extremely simple in its construction, strong, durable, effectual in its operation, and comparatively inexpensive to manufacture.

With the above and other objects in view the invention finally consists in the novel construction, combination, and arrangements of parts to be hereinafter more specifically described, and particularly pointed out in the claims.

In describing the invention in detail reference is had to the accompanying drawings, forming a part of this specification, and wherein like figures of reference indicate similar parts throughout the several views, in which—

Figure 1 is a vertical sectional view of the mold or shaper, showing the handle in side elevation. Fig. 2 is a top plan view. Fig. 3 is an underneath plan view of my improved mold. Fig. 4 is a sectional view of a portion of the mold and cutters, showing the manner of securing and operating. Fig. 5 is a top plan view of a portion of the handle.

In the drawings, 1 represents the mold, which may be formed in any suitable shape; but it is shown herein as cone-shaped. This mold is provided in its top with an aperture for the reception of the rod 2, operating the cutters 3 3, provided within the cone-shaped mold, said cutters being secured to the rod.

The rod 2 is provided at the top of the mold with a collar 4, which limits its movement vertically, and is further provided with a spiral groove 5, which is adapted to receive a lug 9, formed in the aperture of the handle 6. This handle 6 is formed with an upwardly-extending end 7, said end working on the rod and having its movement limited by a nut 8, while the lower half of the handle is secured to the mold 1.

The operation of my improved ice-cream mold will be readily apparent from the views of the same that I have shown in the drawings.

When it is desired to use the mold, the operator grasps the handle and uses the mold as an ordinary dipper. When the same is filled with the cream, it is held on the plate or saucer adapted to receive the cream and the upper half of the handle 6 forced downward, as shown by dotted lines in Fig. 1 of the drawings, which will cause the rod 2, carrying the cutters, to revolve by reason of the lug 9 engaging in the spiral groove 5. This revolving of the cutters will loosen the cream from the sides of the mold and allow the same to fall out into the plate or saucer provided therefor.

By this construction of an ice-cream mold it will be readily observed that but one hand will be required to operate the same, while in the ordinary construction it is necessary to use both hands, one to hold the mold over the plate and the other to turn the cutters to remove the cream. The rod 2 is made of sufficient length, so that one complete turn of the same will turn each of the cutters half-way around, thus cutting the cream from the entire inner surface of the mold and allowing the same to fall out readily.

It will be observed that my improved ice-cream mold will be particularly useful in restaurants and the like, as the operator only being required to use one hand will greatly facilitate the work.

It will also be noted that various changes may be made in the details of construction without departing from the general spirit of my invention.

Having fully described my invention, what I claim as new, and desire to secure by Letters Patent, is—

1. An ice-cream mold, consisting of a body having an apertured top, a rod extending through the aperture with a collar riding on the top, cutters secured to the rod within the body, the rod having a spiral groove, a spring-handle having one end secured to the body and provided at the opposite end with an aperture to receive the rod and means on the handle for turning the rod when the handle is pressed, as and for the purpose described.

2. In an ice-cream mold, the combination of the mold, a rod through the top of said mold carrying cutters on its lower end, said rod having a spiral groove, and a spring-handle attached to the mold and the rod, said handle having a lug in the aperture adapted to receive the rod, to engage in the spiral groove to revolve the cutters when the handle is depressed and released, substantially as shown and described.

In testimony whereof I affix my signature in presence of two witnesses.

ALFRED L. RIGGS.

Witnesses:
 H. E. SEIBERT,
 ALFRED M. WILSON.